US012627056B2

(12) United States Patent
Wang

(10) Patent No.: US 12,627,056 B2
(45) Date of Patent: May 12, 2026

(54) ANTENNA ASSEMBLY AND ELECTRONIC DEVICE

(71) Applicant: BEIJING XIAOMI MOBILE SOFTWARE CO., LTD., Beijing (CN)

(72) Inventor: Wei Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 309 days.

(21) Appl. No.: 18/373,021

(22) Filed: Sep. 26, 2023

(65) Prior Publication Data

US 2024/0313406 A1 Sep. 19, 2024

(30) Foreign Application Priority Data

Mar. 14, 2023 (CN) ......................... 202310267819.3

(51) Int. Cl.
*H01Q 9/04* (2006.01)
*H01Q 19/00* (2006.01)

(52) U.S. Cl.
CPC ......... *H01Q 9/0414* (2013.01); *H01Q 19/005* (2013.01); *H01Q 9/045* (2013.01)

(58) Field of Classification Search
CPC ..... H01Q 9/0414; H01Q 9/045; H01Q 19/005
See application file for complete search history.

(56) References Cited

U.S. PATENT DOCUMENTS

| | | | | |
|---|---|---|---|---|
| 2021/0313703 | A1* | 10/2021 | Stanley | H01Q 21/0006 |
| 2021/0367358 | A1* | 11/2021 | He | H01Q 25/001 |
| 2022/0255229 | A1* | 8/2022 | Jia | H01Q 5/385 |
| 2023/0352840 | A1* | 11/2023 | Tian | H01Q 21/065 |

FOREIGN PATENT DOCUMENTS

CN 107046183 A 8/2017

OTHER PUBLICATIONS

European Patent Application No. 23204581.5 Search Report dated Apr. 8, 2024, 8 pages.

* cited by examiner

*Primary Examiner* — Amal Patel
(74) *Attorney, Agent, or Firm* — Cozen O'Connor

(57) ABSTRACT

An antenna assembly includes: a first dielectric layer having a first radiation patch and a parasitic radiation patch; a second dielectric layer arranged on a side of the first dielectric layer facing away from the first radiation patch, and having a second radiation patch; and a metal layer arranged on a side of the second dielectric layer facing away from the second radiation patch. The metal layer includes a feeding connector, the feeding connector is connected with the second radiation patch in an electrically conductive manner, the feeding connector is configured to input a feeding signal to the second radiation patch, and the second radiation patch is coupled with the first radiation patch and/or the parasitic radiation patch to form at least two polarized radiation beams.

14 Claims, 2 Drawing Sheets

ANTENNA ASSEMBLY AND ELECTRONIC DEVICE

CROSS-REFERENCE TO RELATED APPLICATION

This application is based on and claims priority to Chinese Patent Application No. 202310267819.3 filed on Mar. 14, 2023, the entire contents of which are incorporated herein by reference for all purposes.

BACKGROUND

The millimeter wave communication refers to radio frequency communication using the millimeter waves, or extremely high frequencies (EHF), as the carrier of information transmission. The millimeter wave has prospects for wide application because of its short wavelength and wide frequency band, which can effectively solve many problems faced by high-speed broadband wireless access.

In the related art, including a millimeter wave antenna assembly in an electronic device will occupy the limited space inside the device and affect the implementation of other functions of the electronic device. Therefore, improving the bandwidth and performance of the millimeter-wave antenna based on a limited antenna size has become a focus of further development.

SUMMARY

The present disclosure relates to a field of antennas, and in particular to an antenna assembly and an electronic device.

Embodiments of a first aspect of the present disclosure provide an antenna assembly, and the antenna assembly includes: a first dielectric layer having a first radiation patch and a parasitic radiation patch, in which the first radiation patch includes a first square structure, and the parasitic radiation patch includes strip structures arranged around the first square structure and distributed centro-symmetrically with respect to a center of the first square structure; a second dielectric layer arranged on a side of the first dielectric layer facing away from the first radiation patch, and having a second radiation patch, in which the second radiation patch includes a second square structure, and at least part of projections of the first radiation patch and the second radiation patch on the second dielectric layer overlap; and a metal layer arranged on a side of the second dielectric layer facing away from the second radiation patch, in which the metal layer includes a feeding connector, the feeding connector is connected with the second radiation patch in an electrically conductive manner, the feeding connector is configured to input a feeding signal to the second radiation patch, and the second radiation patch is coupled with the first radiation patch and/or the parasitic radiation patch to form at least two polarized radiation beams.

Embodiments of a second aspect of the present disclosure provide an electronic device, and the electronic device includes an antenna assembly. The antenna assembly includes: a first dielectric layer having a first radiation patch and a parasitic radiation patch, in which the first radiation patch includes a first square structure, and the parasitic radiation patch includes strip structures arranged around the first square structure and distributed centro-symmetrically with respect to a center of the first square structure; a second dielectric layer arranged on a side of the first dielectric layer facing away from the first radiation patch, and having a second radiation patch, in which the second radiation patch includes a second square structure, and at least part of projections of the first radiation patch and the second radiation patch on the second dielectric layer overlap; and a metal layer arranged on a side of the second dielectric layer facing away from the second radiation patch, in which the metal layer includes a feeding connector, the feeding connector is connected with the second radiation patch in an electrically conductive manner, the feeding connector is configured to input a feeding signal to the second radiation patch, and the second radiation patch is coupled with the first radiation patch and/or the parasitic radiation patch to form at least two polarized radiation beams.

It is to be understood that both the foregoing general description and the following detailed description are illustrative and explanatory only and are not restrictive of the present disclosure.

BRIEF DESCRIPTION OF THE DRAWINGS

In order to explain the technical solution in the embodiments of the present disclosure more clearly, the drawings needed to be used in the description of the embodiments will be briefly introduced below. Apparently, the drawings in the following description are only some embodiments of the present disclosure. For those ordinary skilled in the art, other drawings can be obtained according to these drawings without inventive efforts.

DETAILED DESCRIPTION

Reference will now be made in detail to illustrative embodiments, examples of which are illustrated in the accompanying drawings. When the following description refers to the drawings, unless otherwise indicated, the same numbers in different drawings indicate the same or similar elements. The embodiments described in the following description do not represent all embodiments consistent with the present disclosure. Rather, they are merely examples of devices and methods consistent with some aspects of the present disclosure.

The terms used in the present disclosure are for the purpose of describing specific embodiments only and are not intended to limit the present disclosure. Unless otherwise defined, technical terms or scientific terms used in the present disclosure shall have their ordinary meanings as understood by those ordinary skilled in the art to which the present disclosure belongs. The terms "first", "second" and the like used in the present disclosure do not indicate any order, quantity or importance, but are only used to distinguish different components. Likewise, similar words such as "a" or "an" do not mean quantity limitation, but mean that there is at least one. If only "one" is referred to, it will be explained separately. "A plurality of" or "several" means two or more. Unless otherwise specified, similar words such as "front", "rear", "lower" and/or "upper", "top" and "bottom" are only for convenience of explanation, and are not limited to one position or one spatial orientation. Similar words such as "including" or "comprising" mean that the elements or objects before "including" or "comprising" cover the elements or objects listed after "including" or "comprising" and their equivalents, but do not exclude other elements or objects. Similar words such as "couple" or "connect" are not limited to physical or mechanical connection, but may include electrical connection, no matter direct or indirect.

The millimeter wave communication refers to radio frequency communication using the millimeter waves, or extremely high frequencies (EHF), as the carrier of information transmission. The millimeter wave has prospects for wide application because of its short wavelength and wide frequency band, which can effectively solve many problems faced by high-speed broadband wireless access. In the related art, including a millimeter wave antenna assembly in an electronic device will occupy the limited space inside the device and affect the implementation of other functions of the electronic device. The reduction of the antenna size will directly affect the bandwidth and performance of the antenna.

Figure 1:
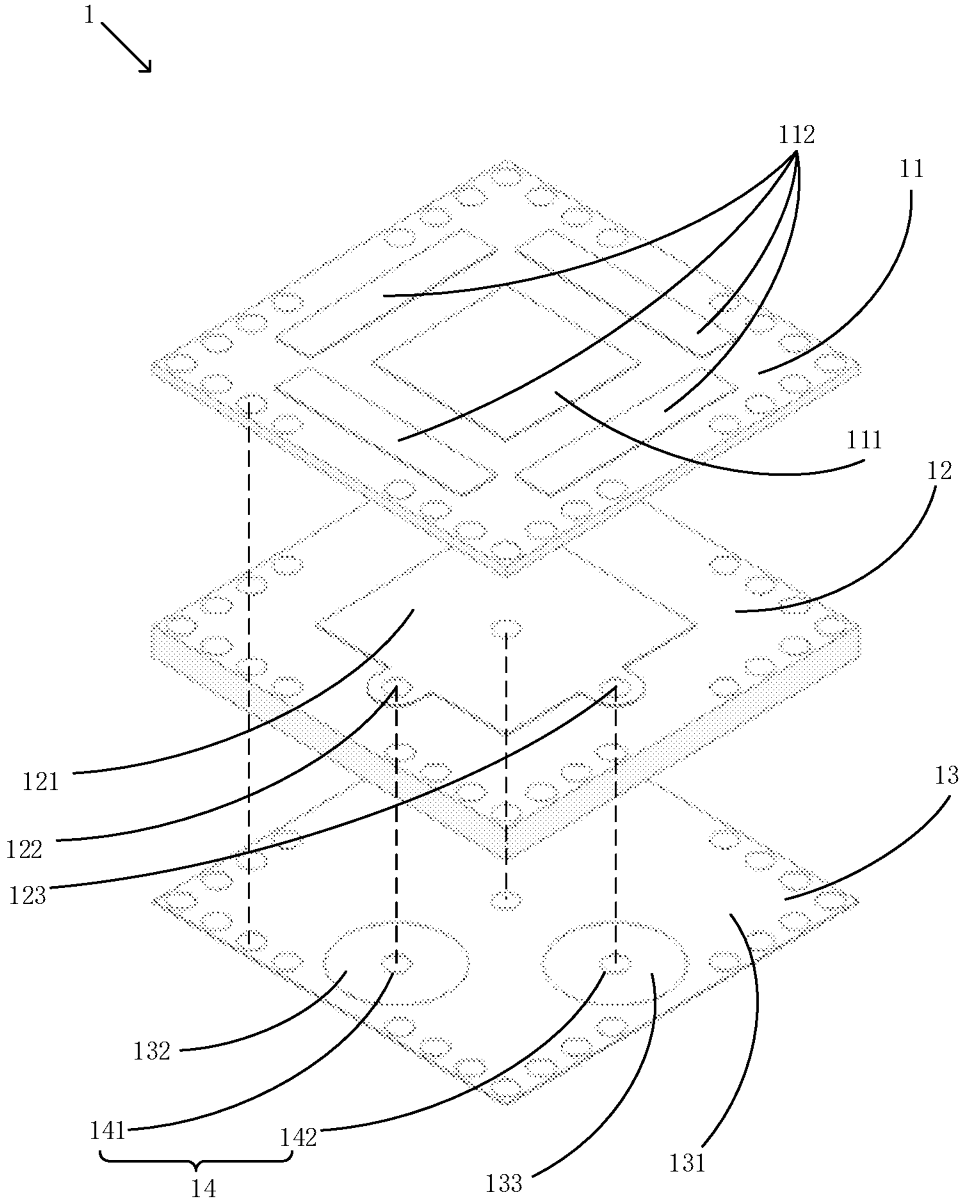
FIG. 1 is an exploded view of an antenna assembly in an illustrative embodiment of the present disclosure.
Figure 2:
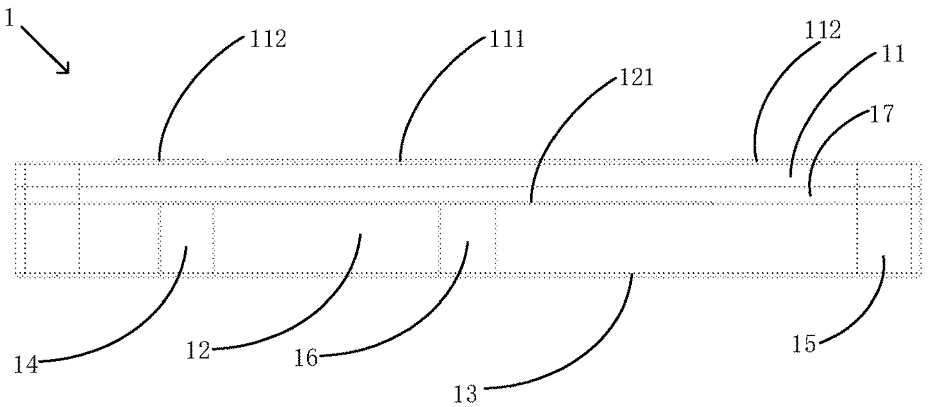
FIG. 2 is a sectional view of an antenna assembly in an illustrative embodiment of the present disclosure.
Figure 3:
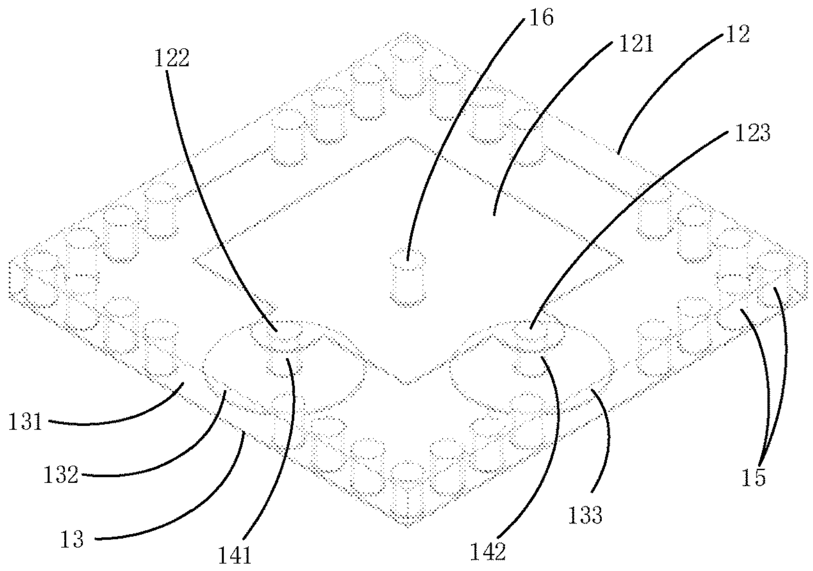
FIG. 3 is an assembled view of an antenna assembly in an illustrative embodiment of the present disclosure.

The present disclosure provides an antenna assembly 1. FIG. 1 is an exploded view of an antenna assembly in an illustrative embodiment of the present disclosure. FIG. 2 is a sectional view of an antenna assembly in an illustrative embodiment of the present disclosure. FIG. 3 is an assembly view of an antenna assembly in an illustrative embodiment of the present disclosure. As shown in FIGS. 1 to 3, the antenna assembly 1 includes a first dielectric layer 11, a second dielectric layer 12 and a metal layer 13. The first dielectric layer 11 has a first radiation patch 111 and a parasitic radiation patch 112. The first radiation patch 111 includes a first square structure, and the parasitic radiation patch 112 includes strip structures which are respectively arranged around the first square structure and distributed centro-symmetrically with respect to a center of the first square structure. The second dielectric layer 12 is arranged on a side of the first dielectric layer 11 facing away from the first radiation patch. The second dielectric layer 12 has a second radiation patch 121, and the second radiation patch 121 includes a second square structure. At least part of projections of the first radiation patch 111 and the second radiation patch 121 on the second dielectric layer 12 overlap. The metal layer 13 is arranged on a side of the second dielectric layer 12 facing away from the second radiation patch 121. The metal layer 13 includes a feeding connector 14, and the feeding connector 14 is connected with the second radiation patch 121 in an electrically conductive manner. The feeding connector 14 inputs a feeding signal to the second radiation patch 121, and the second radiation patch 121 is coupled with the first radiation patch 111 and/or the parasitic radiation patch 112 to form at least two polarized radiation beams.

The first dielectric layer 11 of the antenna assembly 1 has the square first radiation patch 111 and the parasitic radiation patch 112 located around the first radiation patch 111 and distributed centro-symmetrically, and the second dielectric layer 12 has the square second radiation patch 121. The feeding connector 14 inputs the feeding signal to the second radiation patch 121, and the second radiation patch 121 is coupled with the first radiation patch 111 and/or the parasitic radiation patch 112 to form at least two polarized radiation beams. Through the above patch arrangement, the antenna assembly 1 has a low sectional size, and can obtain a large bandwidth and an expected polarization direction.

In the above embodiment, the polarization direction of the antenna assembly 1 can be adjusted by adjusting the feeding technique, and an illustrative explanation of the feeding technique will be given in the following.

In some embodiments, the feeding connector 14 includes a first probe 141 and a second probe 142, and the metal layer 13 has a first avoiding circular hole 132 centered on the first probe 141 and a second avoiding circular hole 133 centered on the second probe 142. Specifically, the metal layer 13 includes an antenna ground plane 131, the first avoiding circular hole 132 and the second avoiding circular hole 133 are formed in the antenna ground plane 131, the first probe 141 is located at a center of the first avoiding circular hole 132, and the second probe 142 is located at a center of the second avoiding circular hole 133. The second dielectric layer 12 includes a first bonding pad 122 and a second bonding pad 123 which are connected to the second radiation patch 121. The first probe 141 and the second probe 142 penetrate through the second dielectric layer 12, respectively. The first probe 141 is connected to the first bonding pad 122, and the second probe 142 is connected to the second bonding pad 123. Since the two probes are connected with the two bonding pads on the second radiation patch 121, respectively, the first probe 141 is used to transmit a polarized feeding signal and the second probe 142 is used to transmit another polarized feeding signal, thus realizing the transmission of two polarized feeding signals. The first avoiding circular hole 132 and the second avoiding circular hole 133 are used to allow the signals to pass therethrough, so that the first probe 141 and the second probe 142 can realize the signal transmission function.

It should be noted that the first probe 141 and the second probe 142 are shown in an apparent manner or an exaggerated manner in FIGS. 2 and 3, while they are merely schematically shown in FIG. 1 without indicating their heights.

The first bonding pad 122 and the second bonding pad 123 are located outside an edge of the second radiation patch 121, so as to avoid the overlapping of the first avoiding circular hole 132 and the second avoiding circular hole 133, and also to avoid the interference of the feeding connection with the structure and function of the second radiation patch 121. For example, the first bonding pad 122 and the second bonding pad 123 are protrusion structures formed by extending outwards from the edge of the second radiation patch 121.

In some embodiments, the first bonding pad 122 and the second bonding pad 123 may be connected to adjacent sides of the second radiating patch 121, respectively, so that the polarization direction corresponding to the motivated mode of the antenna assembly 1 meets the expectation. By adjusting the connection positions of the first bonding pad 122 and the second bonding pad 123 with the adjacent sides of the second radiation patch 121, and the sizes of the first bonding pad 122 and the second bonding pad 123, the impedance matching performance of the antenna assembly 1 can be optimized, so that the antenna assembly 1 can obtain two orthogonal polarization directions. For example, when the antenna assembly 1 feeds a first signal through the first probe 141, the antenna beam may form a first polarization direction. When the antenna assembly 1 feeds a second signal through the second probe 142, the antenna beam can form a second polarization direction, and the first polarization direction is orthogonal to the second polarization direction.

One end of the first probe 141 is connected to the first bonding pad 122, and the other end of the first probe 141 may be connected to one of a coaxial line, a microstrip line and a stripline in an electrically conductive manner. One end of the second probe 142 is connected to the second bonding pad 123, and the other end of the second probe 142 may be connected to one of a coaxial line, a microstrip line and a stripline in an electrically conductive manner. It should be noted that the diameters of the first avoiding circular hole 132 and the second avoiding circular hole 133 may be greater than or equal to 0.25 mm and less than or equal to 0.35 mm. For example, the diameters of the first avoiding circular hole 132 and the second avoiding circular hole 133 may be 0.3 mm. An annular structure (for example, an annular gap) for the signal to pass through is formed between the first avoiding circular hole 132 and the first probe 141, and an annular structure (for example, an annular gap) for the signal to pass through is formed between the second avoiding circular hole 133 and the second probe 142.

In some embodiments, the antenna assembly 1 may further include a shorting member 16, the shorting member 16 penetrates through the second dielectric layer 12, and two ends of the shorting member 16 are connected with the metal layer 13 (i.e. the antenna ground plane 131) and the second radiation patch 121 in an electrically conductive manner, respectively. That is, the shorting member 16 connects the second radiation patch 121 to the ground. The shorting member 16 may be used to suppress the current in the high-order mode on the driving patch and improve the impedance matching performance and the polarization purity in the low frequency band.

It should be noted that the shorting member 16 is shown in an apparent manner or an exaggerated manner in FIGS. 2 and 3, while it is merely schematically shown in FIG. 1 without indicating its height.

The shorting member 16 includes a columnar structure connected with a center of the second radiation patch 121, so as to avoid interference with the adjustment of the polarization direction and the impedance matching performance of the antenna assembly 1 through the arrangement position and structural shape of the shorting member 16.

In some embodiments, the projections of a center of the first radiation patch 111 and the center of the second radiation patch 121 on the second dielectric layer 12 overlap, so as to improve the coupling effect between the second radiation patch 121 and the first radiation patch 111.

The side length of the second square structure may be greater than the side length of the first square structure, so as to obtain a higher resonance frequency signal through the matching between the first square structure and the strip structures of the parasitic radiation patch 112 and to obtain a lower resonance frequency signal through the second square structure. For example, the antenna assembly 1 can cover the n257 frequency band (26.5-29.5 GHZ) and the n258 frequency band (24.25-27.50 GHz) specified by 3GPP through the above patches. The overall thickness of the antenna assembly 1 may be 0.608 mm, that is, the corresponding resonance frequency signal can be realized by 0.049 times the low-frequency wavelength (24.25 GHz)/0.06 times the high-frequency wavelength (29.5 GHZ).

In some embodiments, the parasitic radiation patches 112 with the same size are printed around the first radiation patch 111, which can generate resonant modes of more frequency points and improve the impedance matching bandwidth of the antenna assembly 1. The length of the strip structure may be greater than the side length of the first square structure, so as to generate an enclosing effect on the first square structure and achieve the expected coupling effect.

It should be noted that the strip structure may be rectangular, and two opposite sides of the strip structure are parallel to a side of the first square structure, so as to form a regular patch structure on the first dielectric layer 11 and realize the expected antenna radiation effect. Alternatively, in other embodiments, the strip structure may also be an irregular structure including an oblique side or a curve, while it has a strip shape as a whole. The specific shape of the strip structure is not limited by the present disclosure.

In some embodiments, as shown in FIGS. 1-4, the antenna assembly 1 may further include a shielding member 15, and the shielding member 15 is arranged on the peripheries of the parasitic radiation patch 112 and the second radiation patch 121 to surround the parasitic radiation patch 112 and the second radiation patch 121. The antenna assembly 1 can be shielded by the shielding member 15. When two antenna assemblies 1 are arranged adjacent to each other, the ground current can be cut off, the isolation between the antenna assemblies 1 can be improved, and the signal interference between the adjacent antenna assemblies 1 can be avoided. For example, four or more antenna assemblies 1 may be arranged side by side, and may be shielded by the above shielding member 15.

The shielding member 15 may include hole-shaped structures which penetrate through the first dielectric layer 11, the second dielectric layer 12 and the metal layer 13 and are arranged at intervals. The shielding of the antenna assembly 1 is achieved through the metallized through holes, which simplifies the structural arrangement, reduces the space occupation of the shielding member 15, and helps to reduce the overall size of the antenna assembly 1.

Figure 4:
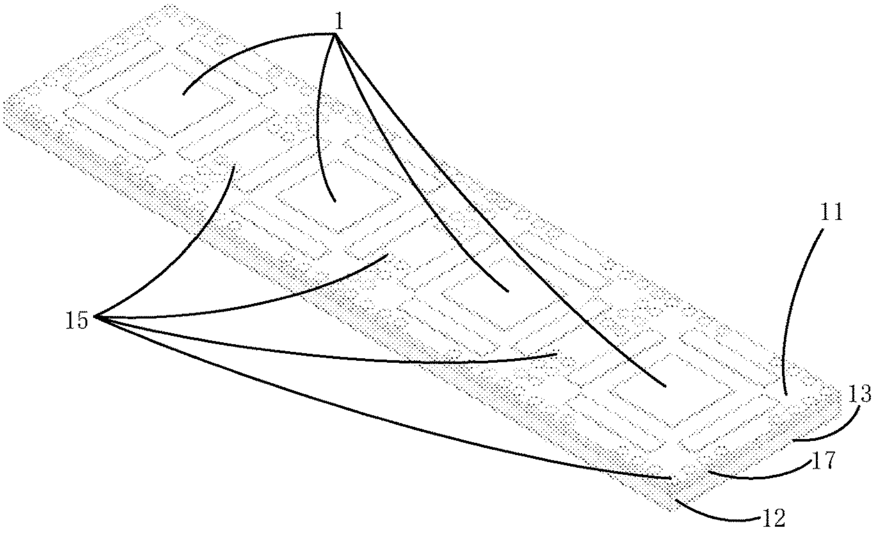
FIG. 4 is a perspective view of an antenna assembly in an illustrative embodiment of the present disclosure.

In some embodiments of the present disclosure, as shown in FIGS. 2 and 4, the antenna assembly 1 may further include a bonding layer 17, and the bonding layer 17 is arranged between the first dielectric layer 11 and the second dielectric layer 12, and configured to bond the first dielectric layer 11 with the second dielectric layer 12. Further, the bonding layer 17 may be a prepreg layer.

In the above embodiments, the thickness of the first dielectric layer 11 may be greater than or equal to 0.012 mm and less than or equal to 0.134 mm. The thickness of the bonding layer 17 may be greater than or equal to 0.08 mm and less than or equal to 0.12 mm. The thickness of the second dielectric layer 12 may be greater than or equal to 0.374 mm and less than or equal to 0.388 mm. For example, the thickness of the first dielectric layer 11 is 0.127 mm, the thickness of the second dielectric layer 12 is 0.381 mm, and the thickness of the bonding layer 17 is 0.1 mm. Further, in comparison to the thicknesses of the first dielectric layer 11, the second dielectric layer 12 and the bonding layer 17, the thickness of the metal layer 13 is too small and hence can be ignored. Thus, through the lamination of the dielectric layers, the overall thickness of the antenna assembly 1 may be is 0.608 mm without taking the metal layer 13 into account.

In addition, the materials of the first radiation patch 111, the second radiation patch 121, the parasitic radiation patch 112 and the metal layer 13 may be metal. The metal layer 13 may be a copper layer located on the side of the second dielectric layer 12 facing away from the second radiation patch 121.

The present disclosure further provides an electronic device, and the electronic device includes the above antenna assembly 1.

The technical solution provided by the present disclosure can at least achieve the following beneficial effects.

It should be noted that the above electronic device may be a mobile phone, a tablet computer, an on-board terminal, a wearable device, a medical terminal, etc., which is not limited by the present disclosure.

Since the first dielectric layer 11 of the antenna assembly 1 has the square first radiation patch 111 and the parasitic radiation patch 112 located around the first radiation patch 111 and distributed centro-symmetrically, and the second dielectric layer 12 has the square second radiation patch 121, the feeding connector 14 inputs the feeding signal to the second radiation patch 121, and the second radiation patch 121 is coupled with the first radiation patch 111 and/or the parasitic radiation patch 112 to form at least two polarized radiation beams. Through the above patch arrangement, the antenna assembly 1 has a low sectional size, and can obtain a large bandwidth and an expected polarization direction.

The above description is only the preferred embodiment of the present disclosure, and it is not used to limit the present disclosure. Any modification, equivalent substitution, improvement, etc. made within the spirit and principle of the present disclosure should be included in the protection scope of the present disclosure.

What is claimed is:

1. An antenna assembly, comprising:

a first dielectric layer having a first radiation patch and a parasitic radiation patch, wherein the first radiation patch comprises a first square structure, and the parasitic radiation patch comprises strip structures arranged around the first square structure and distributed centro-symmetrically with respect to a center of the first square structure;

a second dielectric layer arranged on a side of the first dielectric layer facing away from the first radiation patch, and having a second radiation patch, wherein the second radiation patch comprises a second square structure, and at least part of projections of the first radiation patch and the second radiation patch on the second dielectric layer overlap; and a metal layer arranged on a side of the second dielectric layer facing away from the second radiation patch, wherein the metal layer comprises a feeding connector, the feeding connector is connected with the second radiation patch in an electrically conductive manner, the feeding connector is configured to input a feeding signal to the second radiation patch, and the second radiation patch is coupled with the first radiation patch and/or the parasitic radiation patch to form at least two polarized radiation beams, wherein the feeding connector comprises a first probe and a second probe, and the metal layer has a first avoiding circular hole centered on the first probe and a second avoiding circular hole centered on the second probe;

wherein the second dielectric layer comprises a first bonding pad and a second bonding pad connected to the second radiation patch, the first probe is connected with the first bonding pad, and the second probe is connected with the second bonding pad, wherein the first bonding pad and the second bonding pad are located outside an edge of the second radiation patch.

2. The antenna assembly according to claim 1, wherein the first bonding pad and the second bonding pad are connected with adjacent sides of the second radiation patch, respectively.

3. The antenna assembly according to claim 1, wherein the first probe comprises a first end connected with the first bonding pad, and a second end connected with one of a coaxial line, a microstrip line and a stripline in an electrically conductive manner;

wherein the second probe comprises a first end connected with the second bonding pad, and a second end connected with one of a coaxial line, a microstrip line and a stripline in an electrically conductive manner.

4. The antenna assembly according to claim 1, wherein diameters of the first avoiding circular hole and the second avoiding circular hole are greater than or equal to 0.25 mm, and less than or equal to 0.35 mm.

5. The antenna assembly according to claim 1, further comprising a shorting member, wherein the shorting member penetrates through the second dielectric layer, and two ends of the shorting member are connected with the metal layer and the second radiation patch in an electrically conductive manner, respectively.

6. The antenna assembly according to claim 5, wherein the shorting member comprises a columnar structure connected with a center of the second radiation patch.

7. The antenna assembly according to claim 1, wherein a length of the strip structure is greater than a side length of the first square structure.

8. The antenna assembly according to claim 1, wherein the strip structure has a rectangular shape, and two opposite sides of the strip structure are parallel to a side of the first square structure.

9. The antenna assembly according to claim 1, wherein projections of a center of the first radiation patch and a center of the second radiation patch on the second dielectric layer overlap.

10. The antenna assembly according to claim 1, wherein a side length of the second square structure is greater than a side length of the first square structure.

11. The antenna assembly according to claim 1, further comprising a shielding member, wherein the shielding member is arranged on peripheries of the parasitic radiation patch and the second radiation patch, to surround the parasitic radiation patch and the second radiation patch.

12. The antenna assembly according to claim 11, wherein the shielding member comprises hole-shaped structures penetrating through the first dielectric layer, the second dielectric layer and the metal layer, and arranged at intervals.

13. The antenna assembly according to claim 1, further comprising a bonding layer arranged between the first dielectric layer and the second dielectric layer, and configured to bond the first dielectric layer with the second dielectric layer.

14. An electronic device, comprising an antenna assembly, and the antenna assembly comprising:

a first dielectric layer having a first radiation patch and a parasitic radiation patch, wherein the first radiation patch comprises a first square structure, and the parasitic radiation patch comprises strip structures arranged around the first square structure and distributed centro-symmetrically with respect to a center of the first square structure;

a second dielectric layer arranged on a side of the first dielectric layer facing away from the first radiation patch, and having a second radiation patch, wherein the second radiation patch comprises a second square structure, and at least part of projections of the first radiation patch and the second radiation patch on the second dielectric layer overlap; and a metal layer arranged on a side of the second dielectric layer facing away from the second radiation patch, wherein the metal layer comprises a feeding connector, the feeding connector is connected with the second radiation patch in an electrically conductive manner, the feeding connector is configured to input a feeding signal to the second radiation patch, and the second radiation patch is coupled with the first radiation patch and/or the parasitic radiation patch to form at least two polarized radiation beams, wherein the feeding connector comprises a first probe and a second probe, and the metal layer has a first avoiding circular hole centered on the first probe and a second avoiding circular hole centered on the second probe;

wherein the second dielectric layer comprises a first bonding pad and a second bonding pad connected to the second radiation patch, the first probe is connected with the first bonding pad, and the second probe is connected with the second bonding pad, wherein the first bonding pad and the second bonding pad are located outside an edge of the second radiation patch.

* * * * *